(12) United States Patent
Shih et al.

(10) Patent No.: US 7,824,115 B2
(45) Date of Patent: Nov. 2, 2010

(54) CAMERA MODULE

(75) Inventors: Wun-Chang Shih, Taipei Hsien (TW);
Ching-Hsing Huang, Taipei Hsien (TW); Cheng-Fa Weng, Taipei Hsien (TW); Jen-Te Wang, Taipei Hsien (TW); Huai-Chao You, Shenzhen (CN); Da-Yi Wen, Shenzhen (CN); Biao Wang, Shenzhen (CN); Yun-Ming Hu, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 129 days.

(21) Appl. No.: 12/177,858

(22) Filed: Jul. 22, 2008

(65) Prior Publication Data
US 2009/0310959 A1    Dec. 17, 2009

(30) Foreign Application Priority Data
Jun. 13, 2008    (CN) .......................... 200810067744

(51) Int. Cl.
*G03B 17/00* (2006.01)
*G03B 3/10* (2006.01)
(52) U.S. Cl. ...................... 396/529; 396/133
(58) Field of Classification Search ................ 396/133, 396/529, 542; 348/373–374; 359/819, 823, 359/824
See application file for complete search history.

(56) References Cited

U.S. PATENT DOCUMENTS

| 7,227,442 | B2 | 6/2007 | Skendzic |
| 7,400,463 | B1 * | 7/2008 | Wu ............................ 359/824 |
| 2007/0115565 | A1 | 5/2007 | Shyu et al. |
| 2008/0259468 | A1 * | 10/2008 | Chung ........................ 359/814 |
| 2009/0252488 | A1 * | 10/2009 | Eromaki et al. ............. 396/529 |

FOREIGN PATENT DOCUMENTS

CN          2842489 Y       11/2006

* cited by examiner

*Primary Examiner*—W. B. Perkey
*Assistant Examiner*—Minh Q Phan
(74) *Attorney, Agent, or Firm*—Frank R. Niranjan (57) ABSTRACT

An exemplary camera module includes a lens mount, a lens unit, a magnet unit, a printed circuit board (PCB)-based Rogowski coil and a blade spring. The PCB-based Rogowski coil is fixed around the lens unit. The PCB-based Rogowski coil establishes an induced magnetic field when an electric current is applied thereto. The induced magnetic field interacts with the magnet unit to generate a magnetic force moving the lens unit telescopically. The blade spring includes a plurality of ribs. Each rib includes a moveable end connected with the lens unit and an opposite fixed end. The moveable end moves together with the lens unit with respect to the fixed end to cause the ribs to distort and generate an elastic force. The lens unit stops at a focal position when the magnetic force and the elastic force come to a balance.

11 Claims, 6 Drawing Sheets

CAMERA MODULE

BACKGROUND

1. Technical Field

The present invention relates to cameras, and particularly to a camera module for use in a digital camera, a portable electronic apparatus such as a mobile telephone, a personal digital assistant or other device.

2. Description of Related Art

Camera modules are generally installed in mobile telephones, personal digital assistants or other portable electronic apparatuses due to their convenience and practicality. As design of the camera modules has evolved toward light weight and compactness, so have the currently popular digital camera modules.

Conventionally, a two-step camera module is utilized. The camera module generally includes a lens and a motor driving the lens in telescopic operation. When the camera module operates, the lens is driven by the motor to move from a near focal point to a far focal point, or vice versa.

However, the telescopic movement of the lens is confined to directly movement from one focal point to another, and cannot be precisely located by the motor between the two points. Such a shortcoming needs to be addressed.

SUMMARY

The present invention relates to a camera module. According to an exemplary embodiment of the present invention, the camera module includes a lens mount, a lens unit received in the lens mount, a magnet unit, a printed circuit board-based Rogowski coil and a blade spring. The lens unit includes a lens barrel and a lens received in the lens barrel. The magnet unit includes at least one magnet mounted around the lens unit. The printed circuit board-based Rogowski coil is fixed around the lens barrel. The printed circuit board-based Rogowski coil establishes an induced magnetic field when an electric current is applied thereto. The induced magnetic field of the printed circuit board-based Rogowski coil interacts with a magnetic field of the at least one magnet of the magnet unit to generate a magnetic force moving the lens unit with the printed circuit board-based Rogowski coil telescopically. The blade spring is fixed around the lens barrel. The blade spring includes at least one rib. The at least one rib includes a moveable end connected with the lens unit and an opposite fixed end. The moveable end moves together with the lens unit with respect to the fixed end to cause the at least one rib to distort and generate an elastic force during the telescopic movement of the lens unit. The lens unit stops at a focal position when the magnetic and elastic forces balance.

Other advantages and novel features of the present invention will become more apparent from the following detailed description of embodiment when taken in conjunction with the accompanying drawings.

DETAILED DESCRIPTION OF THE EMBODIMENTS

Reference will now be made to the drawings to describe the various present embodiments in detail.

Figure 1:
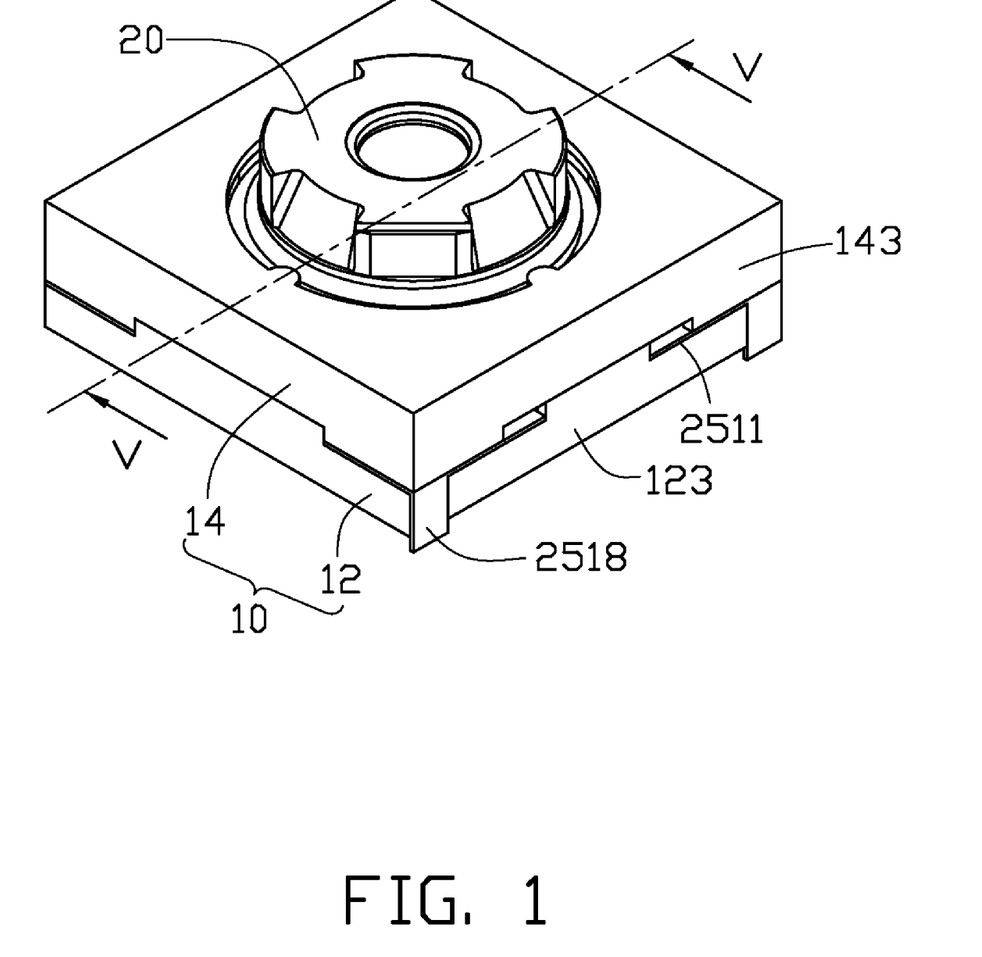
FIG. 1 is an assembled, isometric view of a camera module in accordance with a first exemplary embodiment of the present invention.
Figure 2:
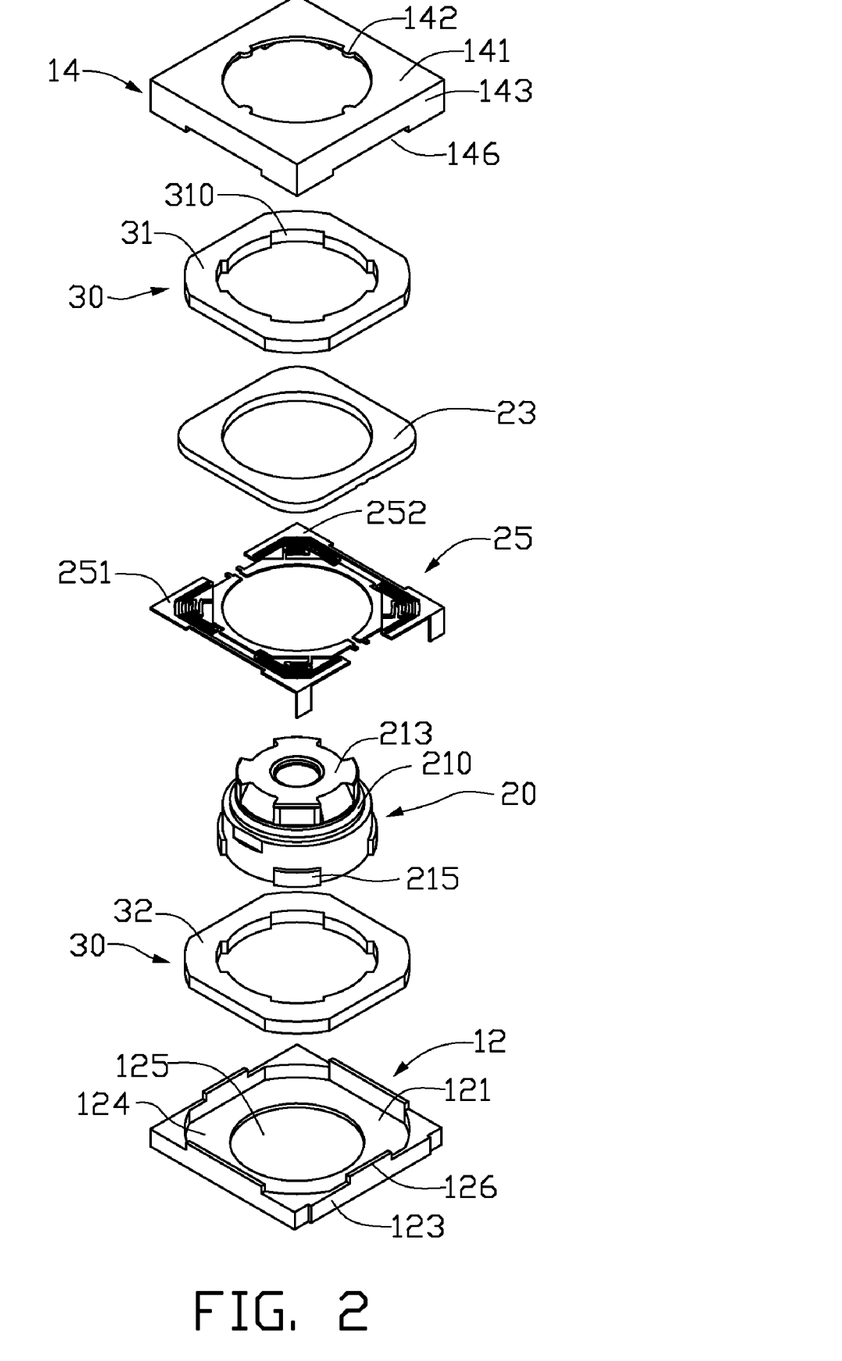
FIG. 2 is an exploded, isometric view of the camera module of FIG. 1.

Referring to FIGS. 1-2, a camera module according to a first exemplary embodiment of the present invention includes a lens mount 10, a lens unit 20, a high precision Rogowski coil 23, a blade spring 25 and a magnet unit 30. The lens unit 20 and the magnet unit 30 are received in the lens mount 10. The magnet unit 30 moves the lens unit 20 telescopically.

The lens mount 10 includes a base 12 and a cover 14. The base 12 includes a square bottom plate 121 and four sidewalls 123 upwardly and perpendicularly extending from four sides of an outer periphery of the bottom plate 121. The bottom plate 121 defines a central hole 125 in a central portion thereof. The bottom plate 121 and the sidewalls 123 cooperatively define a receiving space 124 therein. The receiving space 124 has a substantially rectangular shape with four curved corners. Four locking walls 126 upwardly and perpendicularly extend from the four sidewalls 123 respectively. Each of the locking walls 126 is on a middle portion of a corresponding sidewall 123 of the base 12 and located between two neighboring curved corners of the receiving space 124.

The cover 14 includes a square top plate 141 with a round central hole and four sidewalls 143 downwardly and perpendicularly extending from four sides of an outer periphery of the top plate 141. The top plate 141 and the sidewalls 143 of the cover 14 cooperatively define a receiving space 144 (shown in FIG. 5) therein. Four grooves 146 receiving the four locking walls 126 of the base 12 are defined in the sidewalls 143 of the cover 14, respectively. A plurality of protrusions 142 inwardly and horizontally extend from an inner periphery of the top plate 141. The protrusions 142 are evenly distributed along a circumferential direction of the inner periphery of the top plate 141. Each of the protrusions 142 is semicircular.

The lens unit 20 includes a tubular lens barrel 210 and a substantially cylindrical lens 213 fixedly received in the lens barrel 210. A plurality of guiding tabs 215 horizontally and outwardly extend from an outer periphery of a bottom end of the lens barrel 210. The guiding tabs 215 are evenly spaced along a circumferential surface of the lens barrel 210. Each of the guiding tabs 215 is elongated and rectangular, with a constant thickness along an axial direction.

Figure 3:
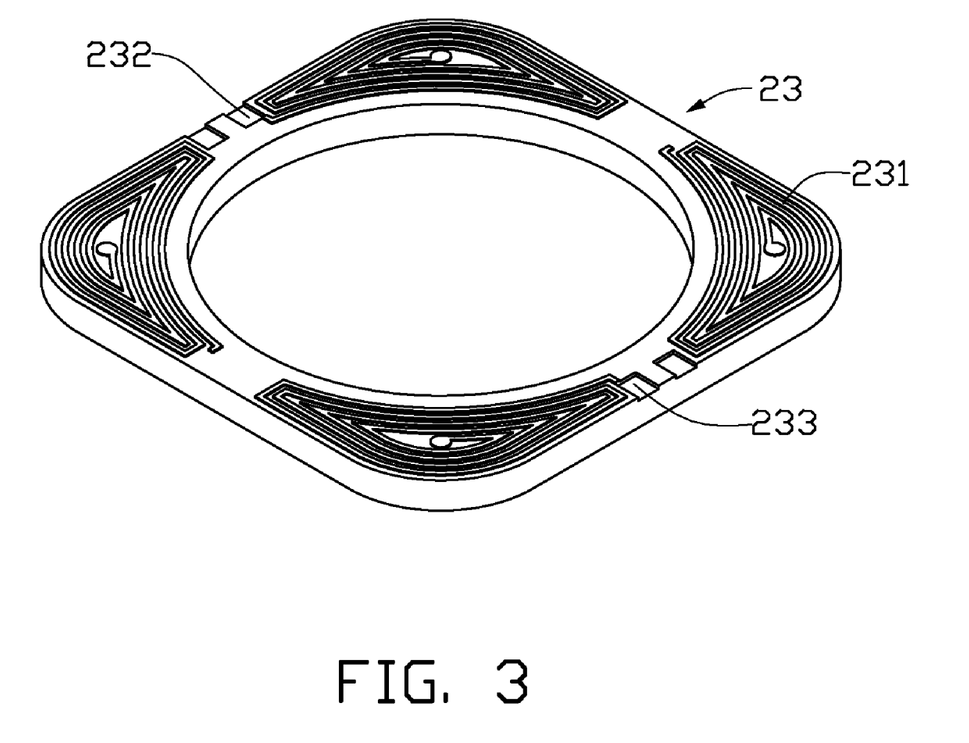
FIG. 3 is a schematic view of a print circuit board-based Rogowski coil of the camera module of FIG. 1, wherein the printed circuit board-based Rogowski coil is inverted in a bottom-to-top manner.

The high precision Rogowski coil 23 is rectangular with a round central hole defined therein. In this embodiment what is used is a printed circuit board (PCB)-based Rogowski coil, which includes two layers of sub-PCBs stacked together. Each sub-PCB contains a plurality of imprinted coils 231 wound in opposite directions (clockwise and counter-clockwise). A top surface and a bottom surface of each sub-PCB are imprinted to form a coil around a center of the PCB-based Rogowski coil. The conductive imprinted coils 231 on the top surface and the bottom surface of each of the sub-PCBs are interconnected by conductive-plated holes (not shown). The PCB-based Rogowski coil operates on a same principle as a traditional Rogowski coil which consists of a wire wound on a non-magnetic core coils. Referring to FIG. 3, the PCB-based Rogowski coil is turned over in a bottom-to-top manner. The PCB-based Rogowski coil forms four generally toroidally-shaped, series-wound imprinted coils 231 on the bottom surface thereof. Two first pads 232 are formed on one side of the bottom surface of the PCB-based Rogowski coil, and two second pads 233 are formed on an opposite side of the bottom surface of the PCB-based Rogowski coil. For example, in this embodiment, the first pads 232 and the second pads 233 are formed on the left-side and the right-side of the bottom surface of the PCB-based Rogowski coil, respectively. One of the first pads 232 which is located adjacent a rear side of the bottom surface of the PCB-based Rogowski coil is electrically connected with one end of the series-wound imprinted coils 231, thereby functioning as an anode pole (or a cathode pole) of the PCB-based Rogowski coil. One of the second pads 233 adjacent to a front side of the bottom surface of the PCB-based Rogowski coil is electrically connected with the other end of the series-wound imprinted coil 231, thereby functioning as a cathode pole (or an anode pole) of the PCB-based Rogowski coil. Thus, the anode pole and the cathode pole of the PCB-based Rogowski coil are located on a diagonal line thereof.

Figure 4:
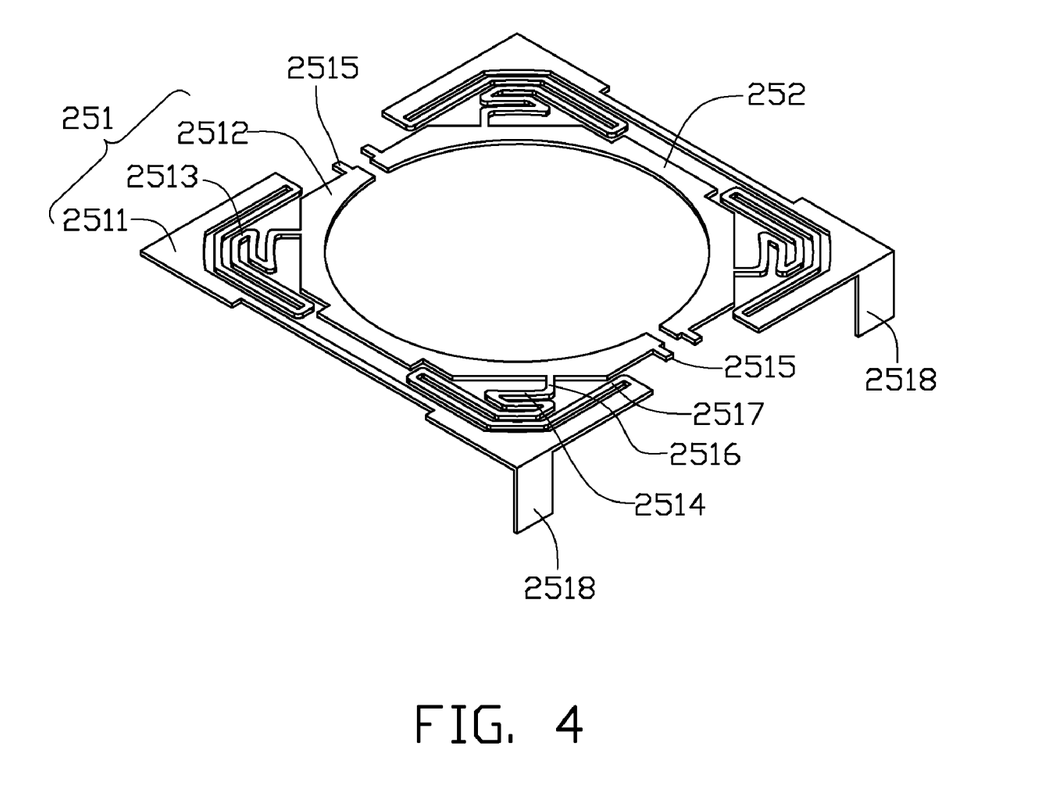
FIG. 4 is an isometric view of an elastic element of the camera module of FIG. 1.

Referring to FIG. 4, the blade spring 25 includes a first elastic element 251 and a second elastic element 252 spaced from each other. The blade spring 25 is made of electrically conductive material such as metal. The first elastic element 251 and the second element 252 are of substantially the same structure. Each of the elastic elements 251, 252 includes an outer frame 2511, an inner frame 2512 spaced from the outer frame 2511, and two elastic ribs 2513 integrally connecting the inner frame 2512 with the outer frame 2511 to from a single piece. The outer frame 2511 is substantially U-shaped. A plated guiding pin 2518 adjacent to one vertex of the outer frame 2511 extends downwardly from one side of the outer frame 2511. The inner frame 2512 is semicircular and received in an inner side of the outer frame 2511. Two connecting pins 2515 outwardly and horizontally extend from two opposite ends of the inner frame 2512 towards two apertures between the outer frames 2511. Each of the connecting pins 2515 is substantially the same size as each of the pads 232, 233 of the PCB-based Rogowski coil. Each of the elastic ribs 2513 includes a first end 2516 connected with an outer periphery of the inner frame 2512 and a second end 2517 connected with an inner periphery of the outer frame 2511. Each of the elastic ribs 2513 forms a plurality of folded segments 2514 between the first end 2516 and the second end 2517 thereof. The outer frame 2511, the inner frame 2512 and the elastic ribs 2513 are coplanar with each other.

Referring again to FIG. 2, the magnet unit 30 includes an upper magnet 31 and a lower magnet 32. The upper magnet 31 and the lower magnet 32 are received in receiving space 124 of the base 12 and the receiving space 144 the cover 14, respectively. Each of the magnets 31, 32 is rectangular with a round central hole, and defines a plurality of grooves 310 on an inner surface, to receive the guiding tabs 215 of the lens barrel 210 therein.

Figure 5:
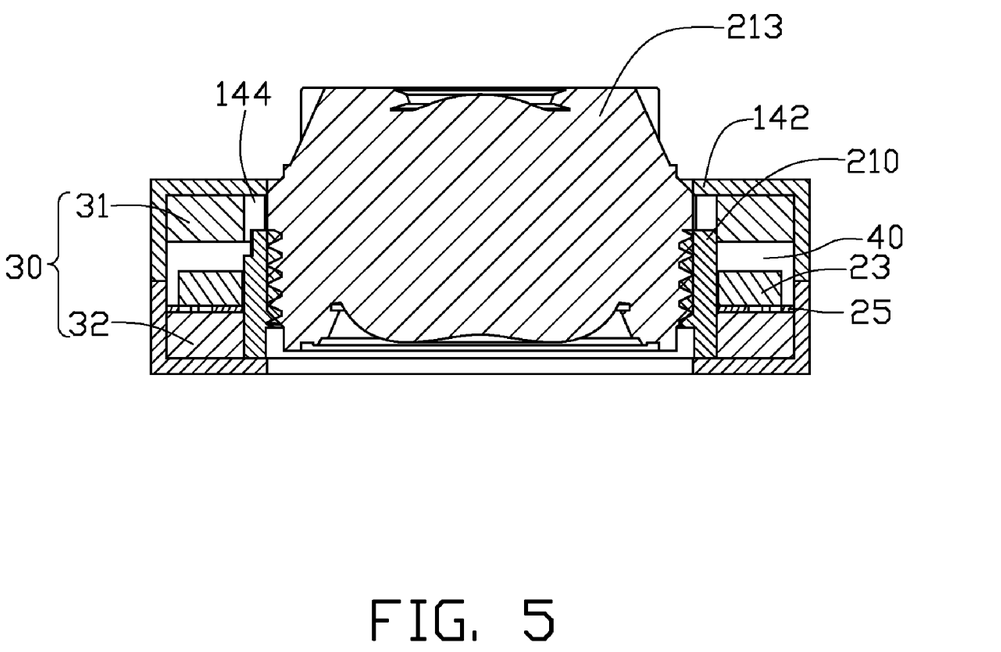
FIG. 5 is a cross-section of the camera module of FIG. 1, taken along line V-V thereof.

Referring to FIG. 5, both the blade spring 25 and the PCB-based Rogowski coil are mounted around the lens unit 20. An inner surface of the PCB-based Rogowski coil is affixed to the outer circumferential surface of the lens barrel 210. The blade spring 25 is located just under the PCB-based Rogowski coil. The connecting pins 2515 of the first and the second elastic elements 251, 252 are connected to the corresponding pads 232, 233 of the bottom surface of the PCB-based Rogowski coil by soldering. The inner frames 2512 of the first and the second elastic elements 251, 252, the PCB-based Rogowski coil and the lens unit 20 cooperatively form a movable section which can telescope along an axial direction of the camera module with respect to the magnet unit 30 during a focus operation of the camera module. The inner frames 2512 of the first and second elastic elements 251, 252 contact the bottom surface of the PCB-based Rogowski coil; thus, the inner frames 2512 of the first and the second elastic elements 251, 252 can be fixedly affixed to the bottom surface of the PCB-based Rogowski coil for reinforced connection therebetween, and the moveable section can be stabilized along the axial direction during focus operation. The first elastic element 251 of the blade spring 25 is located on the front side of the PCB-based Rogowski coil, while the second elastic element 252 of the blade spring 25 is located on the rear side of the PCB-based Rogowski coil. Thus, one of the connecting pins 2515 of the first elastic element 251 connects with the cathode pole (or anode pole) of the PCB-based Rogowski coil, and one of the connecting pins 2515 of the second elastic element 252 connects with the anode pole (or cathode pole) of the PCB-based Rogowski coil.

The upper and lower magnets 31, 32 are fixedly received in the cover 14 and the base 12, respectively. The lens unit 20 with the blade spring 25 and the PCB-based Rogowski coil are first put in the receiving space 124 of the base 12, wherein the guiding tabs 215 of the lens unit 20 engage in the grooves 310 of the lower magnet 32 of the magnet unit 30 to prohibit rotation of the lens unit 20. A clearance is formed between the inner surface of the lower magnet 32 and the outer surface of the lens unit 20.

The cover 14 with the upper magnet 31 covers a top side of the base 12. The locking walls 123 of the base 12 are received in the grooves 146 of the cover 14. The receiving space 124 of the base 12 and the receiving space 144 of the cover 14 communicate to each other. The upper magnet 31 and the lower magnet 32 are separated by a space 40. The space 40 receives the blade spring 25 and the PCB-based Rogowski coil therein. The space 40 is taller than the sum of the heights of the blade spring 25 and the PCB-based Rogowski coil, so that the PCB-based Rogowski coil together with the lens unit 20 can move along an axial direction of the cameral structure between the upper magnet 31 and the lower magnet 32. The outer frames 2511 of the first and the second elastic elements 251, 252 are fixedly sandwiched between the sidewalls 123 of the base 12 and the sidewalls 143 of the cover 14. Thus, the outer frames 2511 of the first and the second elastic elements 251, 252, the upper and the lower magnets 31, 32, the base 12 and the cover 14 cooperatively form a quiescent section which can be maintained stationary during focus operation of the camera module. The guiding pins 2518 of the first and the second elastic elements 251, 252 protrude out of the lens mount 10 and downwardly extend from the outer frames 2511 of the first and the second elastic elements 251, 252 until the bottom surfaces of the guiding pins 2518 are coplanar with the bottom surface of the base 12. The guiding pins 2518 are electrically connected with an anode pole and a cathode pole of a power supply (not shown), arranged under the base 12 and controlled by an image sensor thereof, respectively.

Alternatively, the outer frames 2511 of the first and the second elastic elements 251, 252 can be fixedly affixed to a top surface of the lower magnet 32, thus to connect the outer frames 2511 of the first and the second elastic elements 251, 252 and the lower magnet 32 together. Thus, the outer frames 2511 of the first and the second elastic elements 251, 252, the upper and the lower magnets 31, 32, the base 12 and the cover 14 cooperatively form the quiescent section which can remain in place during the focus operation of the camera module.

During operation, the guiding pin 2518 of the first elastic element 251 connects with the anode pole of the power supply, and the guiding pin 2518 of the second elastic element 252 connects with the cathode pole of the power supply. Thus, the PCB-based Rogowski coil and the power supply are electrically connected, forming an electrical current loop through the first elastic element 251 and the second elastic element 252, and electric current is applied to the PCB-based Rogowski coil by the power supply according to an image signal from the image sensor. The PCB-based Rogowski coil receives the electric current and accordingly establishes an induced magnetic field. The magnetic field of the upper and the lower magnets 31, 32 interacts with the induced magnetic field of the PCB-based Rogowski coil, generating an upward magnetic force. The magnetic force telescopes the lens unit 20 with the PCB-based Rogowski coil along the axial direction of the camera module. In other words, the lens unit 20 is moved upwardly along the axial direction of the camera module. The inner frames 2512 and the first ends 2516 of the elastic ribs 2513 move together with the lens unit 20. The outer frames 2511 and the second ends 2517 of the elastic ribs 2513 do not move. The first ends 2516 of the elastic ribs 2513, which move together with the lens unit 20, function as movable ends, while the second ends 2517 function as fixed ends. Thus, the elastic ribs 2513 of the first and the second elastic elements 251, 252 elastically distort along the axial direction, and a downward elastic force is accordingly generated by the distortion of the elastic ribs 2513. When the lens unit 20 moves to a position where the elastic force and the magnetic force reach a balance, progress thereof is stopped in that position, and focus is accomplished. When the image detected by the image sensor changes, the intensity of the electric current applied to the PCB-based Rogowski coil is accordingly changed to move the lens unit 20 to a corresponding focus position.

Figure 6:
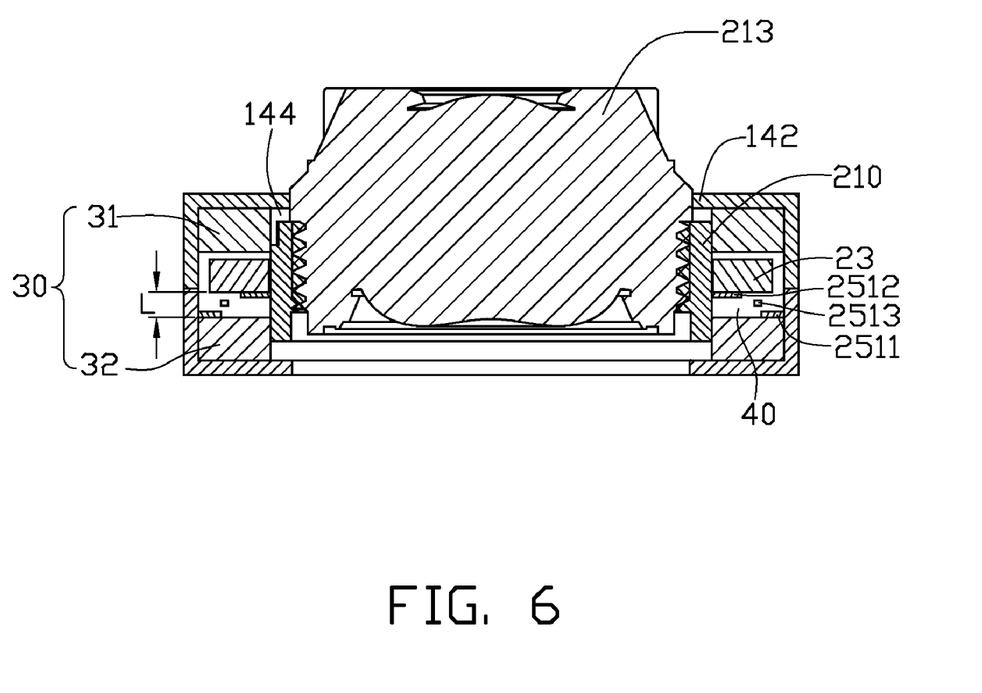
FIG. 6 is another cross-section of the camera module of FIG. 1, wherein a lens unit stops at a corresponding focus position.

For example, during operation, an electric current of 0.4 A (ampere) is applied to the PCB-based Rogowski coil according to the image signal from the image sensor. The PCB-based Rogowski coil establishes an induced magnetic field. The induced magnetic field of the PCB-based Rogowski coil interacts with the magnetic field of the upper and the lower magnets 31, 32. Thus, a magnetic force is generated between the PCB-based Rogowski coil and the upper and the lower magnets 31, 32 to drive the lens unit 20 to move upwardly along the axial direction of the camera module. The first ends 2517 of the elastic ribs 2513 of the first and the second elastic elements 251, 252 move together with the lens unit 20 and the elastic ribs 2513 distort. Referring to FIG. 6, when the lens unit 20 moves up a distance L of 0.2 cm with respect to the top surface of the lower magnet 32, the first ends 2517 of the elastic ribs 2513 also move up by L of 0.2 cm with respect to second ends 2516. If, at this stage, the elastic force generated by the distortion of the elastic ribs 2513 balances with the magnetic force generated by the interaction between the magnetic field of the upper and the lower magnets 31, 32 and induced magnetic field of the PCB-based Rogowski coil, the lens unit 20 stops at its current focal position where the PCB-based Rogowski coil is spaced 0.2 cm from the top surface of the lower magnet 32, as shown in FIG. 6.

In the camera module, mapping between the intensity of the electric current to the PCB-based Rogowski coil and the corresponding focus positions of the lens unit 20 is pre-established. The movement distance L (i.e., the distance between the corresponding focus position and the top surface of the lower magnet 32) of the lens unit 20 is controlled by the intensity of the electric current applied to the PCB-based Rogowski coil, while the intensity of the electric current is determined according to the image detected by the image sensor. When the elastic force generated by the blade spring 25 and the magnetic force generated by interaction between the PCB-based Rogowski coil and the upper and the lower magnets 31, 32 balance, the lens unit 20 is stopped at the corresponding focus position. The PCB-based Rogowski coil is able to precisely stop at different positions between the upper and the lower magnets 31, 32 and the lens unit 20 is able to precisely stop at any desired focus position of the camera module.

In addition, since the Rogowski coil is PCB-based, only simple batch processing technology is required in its manufacture, such as computer controlled manufacturing, which in turn enhances precision of the PCB-based Rogowski coil, providing accurate geometry of the imprinted coils 231. Moreover, the PCB-based Rogowski coil is thinner than a traditional Rogowski coil, enhancing suitability for lightweight and compact device requirements.

Furthermore, the PCB-based Rogowski coil is electrically connected with the power source when the connecting pins 2515 of the first and the second elastic elements 251, 252 are soldered to the pads 232, 233 and the guiding pins 2515 of the first and the second elastic elements 251, 252 are soldered to the anode pole and the cathode pole of the power source respectively, which simplifies assembly. Both the first and second elastic elements 251 are made of metal having similar characteristics to welding solder, enabling firm junctions with the first elastic element 251 and the second elastic element 252, which prevent the welding solder from breaking off from the first and the second elastic element 251, 252. Thus, the junction between the PCB-based Rogowski coil and the first and the second elastic elements 251, 252, and the junction between the power source and first and the second elastic elements 251, 252 are reinforced which prevents the first and the second elastic elements 251, 252 from separating therefrom. Accordingly, the PCB-based Rogowski coil can easily be electrically connected to the power source, the cost of the camera module is reduced, and assembly of the camera module is made easier.

It is to be understood, however, that even though numerous characteristics and advantages of the present invention have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A camera module comprising:
   a lens mount;
   a lens unit received in the lens mount, the lens unit comprising a lens barrel and a lens received therein;
   a magnet unit comprising at least one magnet mounted around the lens unit;
   a printed circuit board-based Rogowski coil fixed around the lens barrel, establishing an induced magnetic field when an electric current is applied thereto, the induced magnetic field of the printed circuit board-based Rogowski coil interacting with a magnetic field of the at least one magnet of the magnet unit to generate a magnetic force telescoping the lens unit with the printed circuit board-based Rogowski coil; and
   a blade spring fixed around the lens barrel, the blade spring comprising a first elastic element and a second elastic element spaced from each other, and at least two ribs, each of the first and the second elastic elements comprising an inner frame and an outer frame, the at least two ribs interconnected between the inner frames and the outer frames of the first and the second elastic elements respectively, the at least two ribs each comprising a moveable end connected with the lens unit and an opposite fixed end, the moveable ends moving together with the lens unit with respect to the fixed ends to cause the at least two ribs to distort and generate an elastic force during the telescopic movement of the lens unit, the lens unit stopping at a focal position when the magnetic force and the elastic force come to a balance;

wherein each of the first and the second elastic elements forms a connecting pin on the inner frame, and the printed circuit board-based Rogowski coil forms a first pad and a second pad thereon for electrically connecting with the connecting pins of the first and the second elastic elements respectively.

2. The camera module of claim 1, wherein the inner frame of each of the first and the second elastic elements is connected with the printed circuit board-based Rogowski coil, and the outer frame of each of the first and the second elastic elements is connected with one of the lens mount and the magnet unit.

3. The camera module of claim 2, wherein each of the ribs comprises a first end connected with the inner frame and a second end connected with the outer frame, the first end functions as the moveable end, and the second end functions as the fixed end.

4. The camera module of claim 1, wherein the printed circuit board-based Rogowski coil comprises a plurality of series-wound imprinted coils to form a coil around a center thereof, the first pad and the second pad of the printed circuit board-based Rogowski coil are electrically connected with two opposite ends of the coil respectively.

5. The camera module of claim 1, wherein the lens mount comprises a base and a cover, the outer frames of the first and the second elastic elements being sandwiched between the base and the cover of the lens mount.

6. The camera module of claim 5, wherein the base comprises a bottom plate and a plurality of sidewalls extending from an outer periphery of the bottom plate toward the cover, a plurality of locking walls extending from the sidewalls of the base towards the cover, the cover comprising a top plate and a plurality of sidewalls extending from an outer periphery of the top plate toward the base, a plurality of grooves defined in the sidewalls of the cover for receiving the locking walls of the base therein.

7. The camera module of claim 1, wherein each of the first elastic element and the second elastic element comprises a guiding pin extending from the outer frame towards a bottom surface of the lens mount adapted for electrically connecting a power supply arranged just under the lens mount.

8. The camera module of claim 1, wherein each of the at least two ribs comprises a plurality of folded segments between the fixed end and the moveable end.

9. The camera module of claim 1, wherein the at least one magnet unit comprises an upper magnet and a lower magnet mounted around a top side and a bottom side of the lens unit respectively, and a clearance is defined between an inner surface of each magnet and an outer surface of the lens unit.

10. The camera module of claim 9, wherein a space is defined between the upper magnet and the lower magnet, with the blade spring and printed circuit board-based Rogowski coil received therein, the space being taller than the sum of heights of the blade spring and the printed circuit board.

11. The camera module of claim 1, wherein a guiding tab outwardly extends from an outer surface of the lens barrel, and a groove is defined in an inner surface of the at least one magnet for receiving the tab therein.

* * * * *